Sept. 3, 1963 G. P. HAMILTON 3,102,567
SNIPPING CUTTER MOUNTING ASSEMBLY
Filed Sept. 12, 1960 2 Sheets-Sheet 2
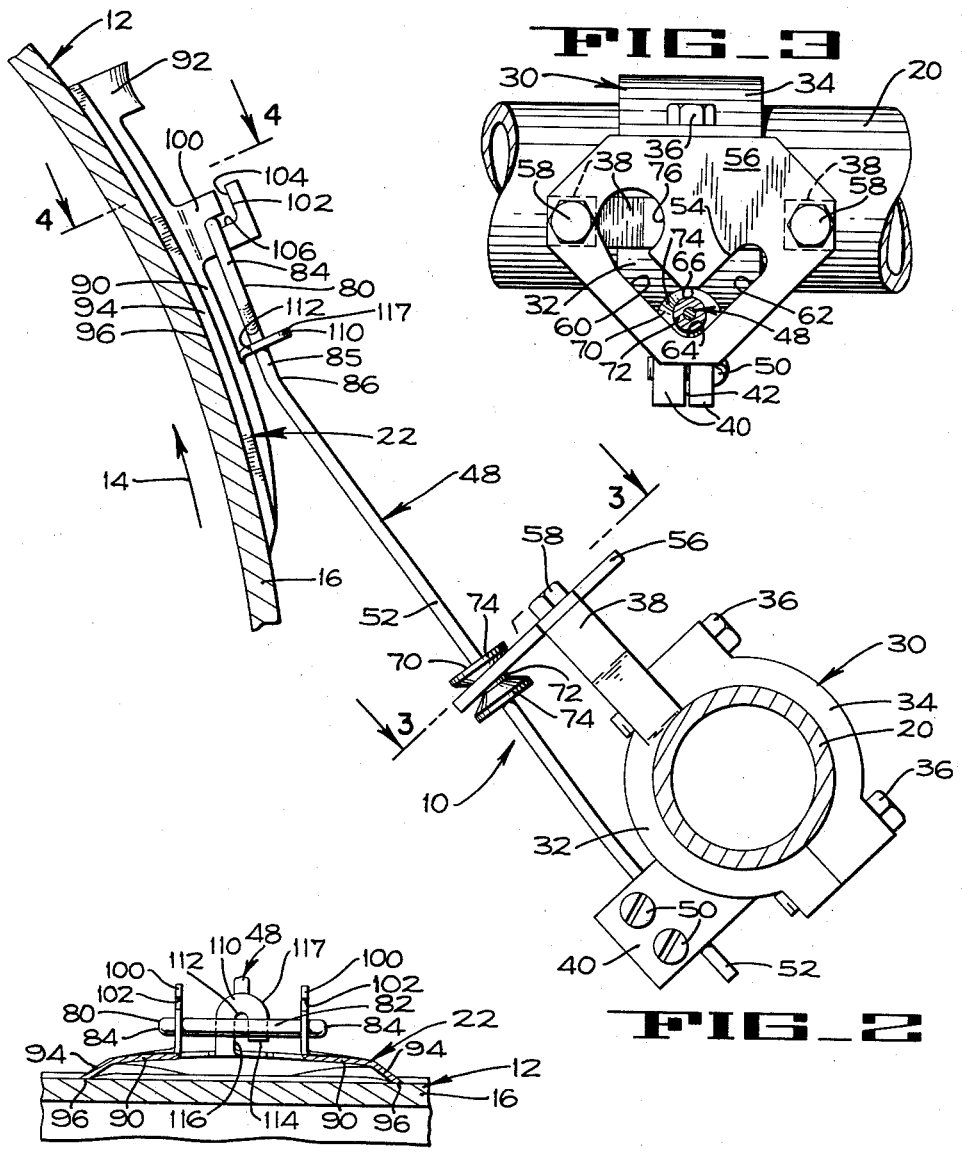
INVENTOR
GERALD P. HAMILTON
BY Hans G. Hoffmeister
ATTORNEY

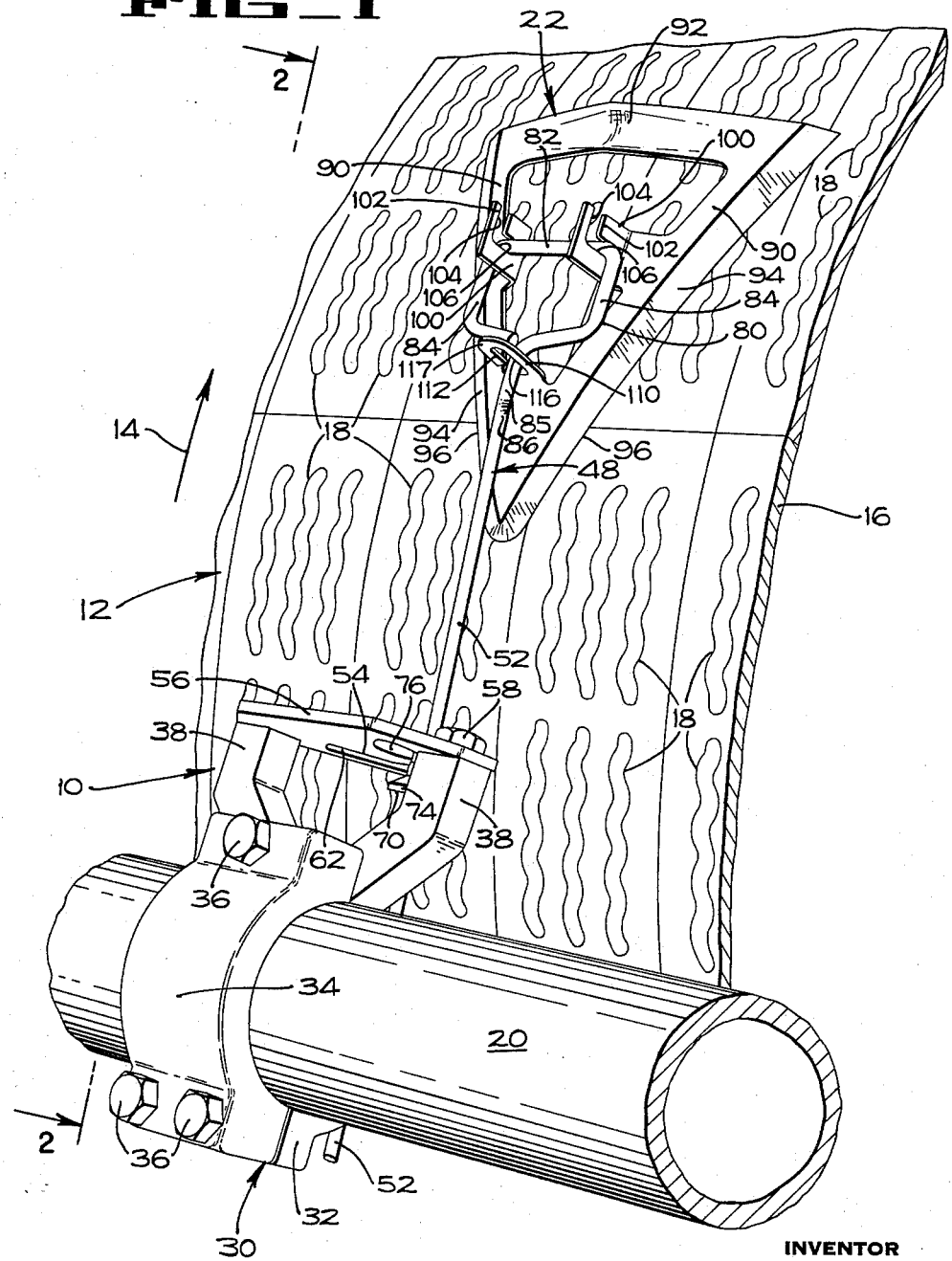

United States Patent Office 3,102,567
Patented Sept. 3, 1963

3,102,567
SNIPPING CUTTER MOUNTING ASSEMBLY
Gerald P. Hamilton, Hoopeston, Ill., assignor to FMC Corporation, a corporation of Delaware
Filed Sept. 12, 1960, Ser. No. 55,421
10 Claims. (Cl. 146—86)

The present invention appertains to apparatus for trimming or snipping the ends from slender elongate vegetables such as string beans and relates more particularly to a snipping knife or cutter mounting assembly employed in such apparatus.

An object of the present invention is to provide an improved bean snipper.

Another object is to provide a snipping cutter mounting assembly having improved means for quickly and easily connecting the cutter to or disconnecting the cutter from the remainder of the assembly.

Another object is to provide an improved snipping cutter mounting assembly capable of uniformly distributing pressure over the entire drum-contacting surfaces of its cutter.

Another object is to provide an improved snipping cutter mounting assembly which is simple in construction and economical to manufacture.

These and other objects and advantages of the present invention will become apparent from the following description and accompanying drawings, in which:

FIG. 1 is a fragmentary perspective of a bean snipping machine showing the snipping and cutter mounting assembly of the present invention.

FIG. 2 is a side elevation of the present snipping cutter mounting assembly taken along lines 2—2 of FIG. 1.

FIG. 3 is a section taken along lines 3—3 of FIG. 2.

FIG. 4 is a section taken along lines 4—4 of FIG. 2.

The snipping cutter mounting assembly 10 of the present invention is employed in snipping or trimming the ends from vegetables such as string beans processed in a bean snipping machine, not shown, of the type disclosed in Patent No. 2,705,516 of J. R. Urschel. Such a machine comprises a cylindrical drum, only a fragment thereof indicated by the numeral 12 being shown, FIG. 1. The drum is mounted for rotation about its own axis and is driven in any convenient manner in the direction indicated by the arrow 14 (FIGS. 1 and 2). The drum 12 may be inclined from one end toward the other, as disclosed in the patent, and its side wall 16 is provided with a plurality of slots 18 (FIG. 1), which may be of serpentine configuration. Beans supplied to the rotating drum 12 at the higher end (not shown) are tumbled about therein so that their unsnipped ends eventually protrude through the slots 18 as the beans gravitate toward the lower end.

Spaced from the side of the drum 12 and coextensive therewith is a plurality of cutter-mounting shafts 20, only one shown, FIGS. 1 and 2. In the present instance, the shafts 20 are of circular tubular cross section. The shafts 20 are held against rotation and are reciprocated axially a limited distance in a manner such as that fully disclosed in the previously mentioned patent.

A plurality of the snipping cutter mounting assemblies 10 (FIGS. 1 and 2), each having a snipping knife or cutter 22 bearing against the wall 16 are secured on the shafts 20. The snipping cutter mounting assemblies 10 are suitably spaced apart along the shafts 20 to assure that, during operation of the bean snipper, the protruding ends of all beans will be snipped. The snipped beans, on reaching the lower end (not shown) of the drum 12 are discharged therefrom in a well known manner.

The snipping cutter assembly 10 comprises a bracket 30 which has a body 32 and a cap 34 which encircles the shaft 20. The bracket is clamped in place on the shaft 20 by cap screws 36 extending through the cap 34 and screwed into the body 32. The body 32 comprises a pair of projecting legs 38 (FIG. 1) of uniform length spaced apart axially of the shaft 20. Also projecting from the body 32 and at a right angle to the legs 38 is a boss 40 (FIGS. 2 and 3). The boss 40 is slit, as indicated at 42 (FIG. 3), on a plane midway between the outer ends of the legs 38.

A blade-holding arm 48 of spring wire, having one end extending into the slit 42 of the boss 40 in substantially parallel relation to the projecting legs 38, is clamped in the boss by cap screws 50. A shank portion 52 of the arm 48, extending from the boss 40, projects through a V-shaped slot 54 (FIG. 3) in an arm-guide plate 56 connected by cap screws 58 to the outer ends of the legs 38.

The guide plate 56 extends at a right angle to the plane of the slit 42 in generally parallel relation to the adjacent side of the boss 40. The arms 60 and 62 of the V-shaped slot 54 extend upward (FIG. 3) from the rounded apex 64 thereof which is located substantially in the plane of the slit 42. A flat side portion 66 of the slot 54 (FIG. 3), opposite the apex 64, is spaced therefrom a greater distance than the width of the slot in general, for a purpose to be made clear hereinafter.

A spool 70, which is both slidable and rotatable on the shank portion 52 of the cutter-holding arm 48 is located in the slot 54 to guide the arm therein. The guide spool 70 has a cylindrical body 72 (FIG. 3) of somewhat less diameter than the width of the slots 54 which enables the spool to be canted therein with respect to the guide plate 56 as well as to be moved easily along the slot 54. Flaring rims 74 at opposite ends of the body 72, respectively, permit limited canting of the spool 70 in the slot 54 but retain the spool therein under normal working conditions. An enlarged opening 76 (FIG. 3) at the outer end of the slot-arm 60 enables introducing the spool 70 into or withdrawing the spool from the slot 54.

The outer end of the blade-holding arm 48 (FIG. 1) has a loop or eye 80 which cooperates with the blade 22 to hold the same in operating position on the arm 48 and against the drum 12. The eye includes a cross bar or elongate head 82 which extends at a right angle to the shank 52. Opposite side members 84 of the eye 80 extend toward the bracket 30 (FIG. 1) from the head 82 in planar relation thereto and provide the head with lateral limit stops at its opposite ends. The outer end portion 85 of the shank 52 is bent upward at 86 (FIG. 2) to dispose the portion 85 at approximately a right angle to a radius of the drum 12 when the snipping cutter asembly 10 is in use.

The cutter 22, as understood best from FIG. 1, is of triangular configuration in plan and is formed of relatively thin material suitable for retaining a cutting edge. The cutter 22 includes two interconnected narrow blade portions 90 of equal length which diverge in the direction of drum rotation. The distal ends of the blade portions 90 are connected by a bar 92 of similar width which is bowed upward away from the drum 12. The blades 90 and bar 92 thus constitute the body of the triangular cutter 22 which is symmetrical about a longitudinal center line (not shown).

The outer edge portions 94 (FIG. 4) of the blade portions 90 are angled downward and outward and the cutter 2 is bowed lengthwise (FIGS. 2) to conform closely to the curvature of the drum 12. The edge portions 94 are sharpened and provide arcuate drum contacting surfaces 96 on the underside of the cutter 22 (FIG. 4). It will be clear, therefore, that only the drum contacting surfaces 96 of the cutter 22 engage the outer surface of the drum 12 during bean snipping operations.

The cutter 22 is provided, at a location approximately one-third of its length from the bar 92, with opposite longitudinal tabs 100 on the inner edges on the blade portions 90 to aid in connecting the cutting 22 to the arm 48. The tabs 100, projecting upward (FIG. 4) transversely of the drum 12, are parallel to each other and are spaced apart a distance slightly less than the distance between the lateral limit stops 84 of the eye 80. Open ended slots 102, of L-shaped configuration, aligned transversely of the cutter 22, are provided in the tabs 100, respectively. One portion 104 (FIG. 2) of each L-shaped slot 102 extends into its tab 100 from the side thereof adjacent the bar 92 and the other portion 106 extends downward from the arm 104 on a radius of the arc defined by the drum contacting surfaces 96. The aligned slot portions 106 in effect define a groove on the body of the cutter 22 in which the head 82 is received. It is to be understood that whereas the entire diameter of the head 82 is received in the groove below the slot portion 104 (FIG. 2), the groove may be considerably more shallow than that shown.

A transverse tab 110 (FIGS. 1, 2, and 3), located adjacent the intersection of the blade portions 90, projects upward therefrom. An open-ended slot 112, of L-shaped configuration, is provided in the tab 110. One portion 114 of the slot 112 (FIG. 4) extends into the tab 110 from one side thereof adjacent one of the blade portions 90 and the other portion 116 of the slot 112 extends upward from the portion 114 on a radius of the arc defined by the drum contacting surfaces 96. The slotted tab 110 thus provides an elongate hook 117 on the cutter 22 in which the slot portion 116 receives the shank 52 of the cutter-holding arm 48 adjacent the eye 80.

When the cutter 22 is connected to the blade-holding arm 48, the cross bar or head 82 thereof is located in the groove defined by the slot portions 106 of the tabs 100, while the portion of shank 52, that is between the eye 80 and the bend 86, is in the slot portion 116 of the hook 117. The lateral limit stops 84 at opposite ends of the head 82 are located adjacent the opposite outer sides of the tabs 100, as may be best understood from FIGS. 1 and 4.

With a plurality of snipping knife assemblies 10 of the present invention mounted on the shaft 20, and with the cuters 22 engaging the drum 12 in the manner shown in FIGS. 1 and 2 the cutters are installed under suitable resilient pressure against the drum 12 before performance of a bean snipping operation. Installation of the cutters is accomplished by rotating each assembly 10 in a counterclockwise direction (FIG. 2), with the cutter 22 thereof engaging the drum 12, until the body 72 of the spool 70 is out of engagement with the sides of the slot 54 (FIG. 3) between the apex 64 and the flat portion 66. The shank 52 of the cuter-holding arm 48 is thus placed under stress to urge the cutter 22 into resilient operative engagement with the drum 12. The cap screws 36 are then tightened to clamp the bracket 30 securely to the shaft 20 and retain the snipping cutter assembly 10 in operating position. As the cutters 22 are reciprocated longitudinally of the drum during rotation thereof, in the manner disclosed in the previously mentioned patent, the ends of the beans (not shown) protruding from the drum through the slots 18 are trimmed or snipped in a manner common to bean snippers of the type disclosed in the above mentioned Urschel patent.

When the cutter 22 is in operative engagement with the drum 12, as described above and as shown in FIGS. 2 and 4, the head 82 of the eye 80 is seated in the groove defined by the slot portions 106 against the tabs 100. The shank 52 of the cutter-holding arm 48 in the hook 117 is spaced between opposite ends of the slot portion 116.

Thus, the cutter 22 is free to pivot a limited distance either clockwise or counterclockwise (FIG. 2), as permitted by the slot portion 116, about the elongate head 82 in the groove in adjusting to certain unevenness in the drum's surface. However, movement of the cutter longitudinally of the drum with respect to the cutter-holding arm 48 is prevented by the hook 117 as well as by engagement of the tabs 100 with one or the other of the lateral limit stops 84 at the ends of the head 82.

The particular location, longitudinally of the cutter 22, at which the head 82 of the arm 48 engages the cutter 22 assures that the drum engaging surfaces 96, throughout their entire lengths, are held under uniform pressure against the drum. For this reason, the cutter 22 will resist forces tending to cause unwarranted motion or distortion thereof. In addition, wear of both the cutter and the drum from engagement therebetween is held at a minimum.

If some foreign object, included inadvertently with the beans in the drum 12 and projecting through a slot 18, should be carried thereby into engagement with one blade portion 90 of a cutter 22, the cutter will be deflected sidewise against the resilience of the cutter-holding arm 48. Such an action flexes the shank portion 52 of the arm 48 sidewise to thereby cant the spool 70 and carry its cylindrical body 72 into camming engagement with one or the other of the upwardly directed arms 60 or 62 of the V-shaped slot 54. The spool 70 is therefore raised, and as a result the cutter 22 is raised from the drum 12 to clear the foreign object. Thereafter, the resiliency of the arm 48 returns the spool 70 to the position in the slot 54, as shown in FIGS. 2 and 3, with the cutter 22 operatively engaging the drum 12 (FIGS. 2 and 3).

Once the position of the bracket 30 is set to hold its cutter 22 in operative position against the drum 12, it does not need to be loosened from the shaft 20 in order to remove or replace the cutter 22. This may be done by flexing the arm 48 away from the drum 12 until the head 82 is spaced sufficiently far therefrom to allow removal of the cutter from or attachment of the cutter 22 to the outer end of the arm in an obvious manner.

It will appear from the foregoing description that the snipping cutter mounting assembly 10 of the present invention is not only simple and easy to manufacture but is so designed that it enables quick and easy connection or disconnection of the cutter 22, and assures uniform application of pressure of the cutter to the drum throughout the entire drum contacting surfaces 96.

While a particular embodiment of the present invention has been shown and described it will be understood that the snipping cutter mounting assembly of the present invention is capable of modification and variation without departing from the principles of the invention and that the scope of the invention should be limited only by the scope and proper interpretation of the claims appended hereto.

The invention having thus been described, what is believed to be new, and desired to be protected by Letters Patent is:

1. In a cutter mounting assembly, a cutter having a body, wall means carried by said cutter body defining an elongate open ended slot, and a cutter mounting arm having a bar pivotally seated against a wall of said slot and disposed adjacent another wall of the slot for movement longitudinally of the slot toward and away from the open end thereof, the open end of said slot and bar providing a quick-disconnect connection between said cutter and said mounting arm.

2. In a cutter mounting assembly, a cutter body, means including a plurality of spaced wall members carried by said cutter body defining an open-ended slot, and an elongate cutter mounting arm having a bar pivotally seated in said slot, said cutter being pivotable about said bar in said slot and retained for limited pivoting movement about a longitudinal axis defined by said elongate mouting arm by the engagement of said bar with spaced and opposed wall members of said plurality of wall members, said bar being moveable longitudinally of said slot to the open end thereof for removal from said cutter body.

3. In a cutter mounting assembly for use with a perforate cylindrical drum rotatable about its axis, a cutter having a body, means carried by said cutter body defining an elongate groove, a cutter mounting arm having an elongate bar seated in said groove, said cutter being pivotable about said bar in said groove and retained by said groove defining means against pivoting movement on said bar about an axis that is perpendicular to the bar and disposed in the radial plane of said cylindrical drum that passes through said bar, and means carried by said body and engageable with said arm at a location spaced from said bar to limit pivoting movement of said cutter about said bar.

4. In a cutter mounting assembly for use with a perforate cylindrical drum rotatable about its axis, a cutter having a body, means carried by said cutter body defining an elongate groove, a cutter mounting arm having an elongate bar seated in said groove, said cutter being pivotable about said bar in said groove and retained by said groove defining means against pivoting movement on said bar about an axis that is perpendicular to the bar and disposed in the radial plane of said cylindrical drum that passes through said bar, and means carried by said bar adjacent opposite ends thereof and engageable with said groove defining means adjacent opposite ends of said groove to prevent shifting of said cutter and said bar relatively to each other longitudinally of said bar.

5. In a cutter mounting assembly for use with a perforate cylindrical drum rotatable about its axis, a cutter having a body, means carried by said cutter body defining an elongate groove, an arm having an elongate bar seated in said groove, said cutter being pivotable about said bar in said groove and retained by said groove defining means against pivoting movement on said bar about an axis that is perpendicular to the bar and disposed in the radial plane of said cylindrical drum that passes through said bar, means carried by said bar adjacent opposite ends thereof and engageable with said groove defining means adjacent opposite ends of said groove to prevent shifting of said cutter and said bar relatively to each other longitudinally of said bar, and abutment means carried by said body and engageable with said arm at a location spaced from said bar to limit pivoting movement of said cutter about said bar.

6. In a bean snipper having a perforate cylindrical drum rotatable about its axis, and cutter mounting means adjacent the drum, the combination comprising a cutter having an arcuate body adapted to engage the side of the drum and arranged to snip the ends from beans protruding through the perforations in the drum, transversely spaced tabs in fixed position on said cutter body, said tabs having aligned slots extending radially of said arcuate body, an arm carried in fixed position on the cutter mounting means and extending therefrom toward the drum, and an elongate head on said arm seated in said slots whereby said arm retains said cutter body in bean snipping engagement with the drum, said cutter being pivotable about said head in said slots and retained by said tabs against pivoting movement on said head about an axis perpendicular thereto.

7. In a bean snipper having a perforate cylindrical drum rotatable about its axis, and cutter mounting means having a fixed location adjacent the side of the drum, the combination comprising a cutter having a body adapted to engage the side of the drum and arranged to snip the ends from beans protruding through the perforations in said drum, spaced tabs in fixed position on said cutter body, said tabs having aligned slots extending outward from said cutter body, a resilient arm carried in fixed position on said cutter mounting means and extending therefrom toward said drum, an elongate head on said arm extending transversely thereto and resiliently seated in said slots for said arm to urge said cutter body into bean snipping relation with the drum, said cutter being pivotable about said head in said slots and retained by said tabs against pivoting movement on said head about an axis perpendicular thereto, and lateral limit stops on said head engageable with said tabs to prevent shifting of said cutter and said head relatively to each other longitudinally of said head.

8. In a cutting assembly, a triangular cutting body having two upright flanges each providing an open-ended, inverted L-shaped slot; and an elongate mounting arm having a distal end portion which partially encloses said flanges and is pivotally seated on pivot surfaecs at the base of the slots, said distal end portion being movable in said slots longitudinally thereof from a position of engagement with said pivot surfaces to a release position opposite the open ends of said slots, relative movement of said flanges and said arm when said distal end is in release portion being effective to disconnect said arm from said cutting body.

9. A cutter mounting assembly for use with a bean snipper having a perforate cylindrical drum rotatable about its axis and an arcuate cutter adapted to engage the side of the drum and arranged to snip the ends from beans protruding through perforations in the drum, the improvement comprising transversely spaced tabs provided by said cutter in fixed position thereon, each of said tabs providing an open-ended, inverted L-shaped slot aligned with the slot provided by the other tab; an elongate resilient arm carried in fixed position on said cutter mounting assembly having a distal end defining a rigid rectangular loop that partially encloses said tabs, an outer portion of said loop having a bar pivotally and resiliently seated in said slots and capable of rapid removal therefrom; and means provided by said tabs for restraining said loop and said bar from longitudinal movement relative to said slots while said cutter is in an operative position.

10. In a cutting device, a cutter support member; a cutter body; and means mounting said cutter body on said support member, said mounting means including means on said cutter body defining a slot having an open end spaced from said body and a closed end adjacent said body, the open end of said slot being arranged to face away from said cutter support member and the closed end of said slot providing a pivot surface, a fixed elongate resilient arm having one end secured to said cutter support member and having a distal end defining a rigid loop arranged to be inserted into said slot through the open end thereof, said resilient arm continually urging said loop downwardly in said slot into pivotal engagement with said pivot surface while said cutter body is in an operative position, and means carried by said body spaced from said slot-defining means and providing an arm-engaging hook having an opening adjacent said body for receiving said arm and a passage extending longitudinally of said hook away from said body whereby, when said resiliently-loaded loop is disposed in said slot and said bar is disposed between the walls of the passage in said hook, the cutter body, arm and loop can move only as an integral unit.

References Cited in the file of this patent

UNITED STATES PATENTS 3,010,498   Carlson _____ Nov. 28, 1961

FOREIGN PATENTS 1,218,830   France _____ Dec. 21, 1959